United States Patent [19]

Adomatis

[11] Patent Number: 4,949,464
[45] Date of Patent: Aug. 21, 1990

[54] BATTERY OPERATED COPING SAW

[76] Inventor: Brandon J. Adomatis, 15715 Hazel Dell Rd., Noblesville, Ind. 46060

[21] Appl. No.: 290,296
[22] Filed: Dec. 27, 1988
[51] Int. Cl.5 .............................................. B27B 19/02
[52] U.S. Cl. ...................................... 30/509; 30/392; 30/DIG. 1
[58] Field of Search ................. 30/509, 514, 517, 392, 30/DIG. 1

[56] References Cited

U.S. PATENT DOCUMENTS

| 2,206,614 | 7/1940 | O'Hern . | |
|---|---|---|---|
| 2,329,030 | 9/1943 | Baronick | 30/513 |
| 2,498,160 | 2/1950 | Gavoli et al. . | |
| 2,630,148 | 3/1950 | Ferguson . | |
| 2,753,898 | 7/1956 | McFarland . | |
| 2,795,251 | 6/1957 | Oleksy | 30/509 |
| 3,952,239 | 4/1976 | Owings et al. | 30/DIG. 1 |
| 4,095,635 | 6/1978 | Hutchins . | |
| 4,555,849 | 12/1985 | Ando et al. . | |

Primary Examiner—D. S. Meislin
Assistant Examiner—M. Rachuba
Attorney, Agent, or Firm—Woodard, Emhardt, Naughton Moriarty & McNett

[57] ABSTRACT

A cordless, electric handsaw. A U-shaped frame is removably mounted to the saw main frame to support the outer end of a coping saw blade having an inner end removably mounted to a reciprocably driven linkage connected to a battery operated motor contained in the handle. A keyhole saw blade is mountable to the reciprocably driven cylinder once the coping saw blade is removed.

11 Claims, 3 Drawing Sheets

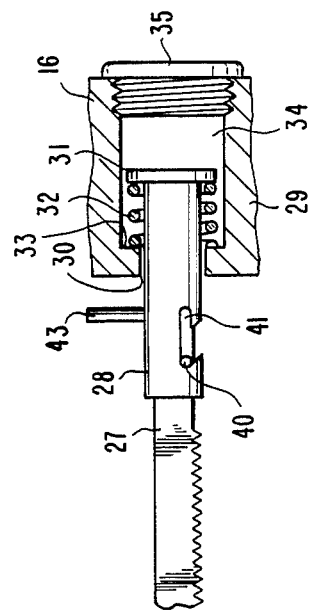
Fig. 4
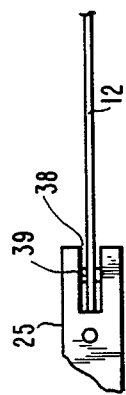
Fig. 3
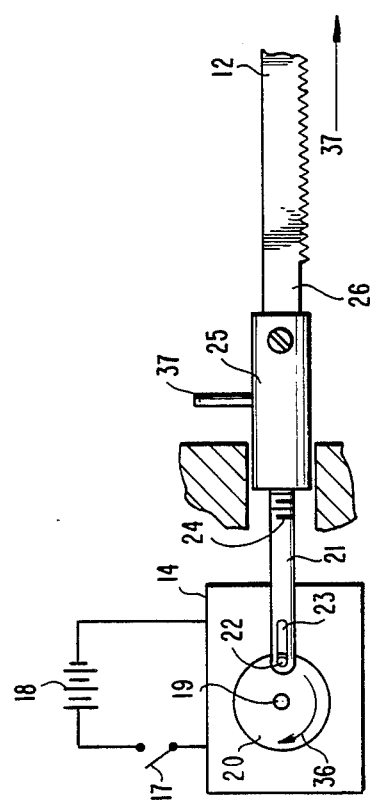

BATTERY OPERATED COPING SAW

BACKGROUND OF THE INVENTION

This invention is in the field of portable tools, and more specifically battery operated hand saws. Small, but relatively powerful battery operated motors have made possible power driven, cordless hand tools. Such a tool, for example, is the battery operated screw driver.

A coping saw is used to cut wood at various angles to create a coped appearance. A typical coping saw, such as shown in U.S. Pat. No. 4,095,635 issued to Hutchins, has a relatively thin saw blade held at its opposite ends by a U-shaped frame. Heretofore, it has not been possible to have a power driven coping saw since the tool must be relatively light weight, and have a main body configured to allow the saw to cut quickly, accurately, and at the desired angle. The wood worker's efficiency when using a coping saw is greatly increased through the utilization of a power driven, easily maneuverable coping saw.

Power driven saws have been previously provided, but not specifically for coping saw application. For example, electrically driven reciprocating saws are shown in U.S. Pat. No. 2,630,148 issued to Ferguson, U.S. Pat. No. 2,498,160 issued to Gavoli, et al., U.S. Pat. No. 2,753,898 issued to McFarland and U.S. Pat. No. 2,206,614 issued to O'Hern. Battery powered portable saws are also known such as the circular saw disclosed in U.S. Pat. No. 4,555,849 issued to Ando, et al. All of these patented tools incorporate power sources which are relatively heavy in construction when combined with the structure for holding the saw blade and therefore are inapplicable for use with a coping saw blade. I have therefore designed a coping saw blade holder used in combination with a battery operated motor to provide a highly maneuverable, accurate and lightweight power driven coping saw.

Coping saw blades must be supported at the opposite ends thereof whereas a keyhole saw blade is supported only at one end. The saw holder disclosed herein is adaptable to hold a keyhole saw blade in lieu of a coping saw blade once a portion of the blade holder is removed. The tool disclosed herein is therefore versatile in that more than one type of saw blade may be held and driven by the power source.

SUMMARY OF THE INVENTION

One embodiment of the present invention is a battery operated coping saw comprising a main frame, a coping saw blade removably and reciprocably mounted to the main frame and including a proximal end and a distal end, the coping saw blade including a thin main body incapable of supporting itself during sawing without the distal end supported, a motor mounted to the main frame and having a reciprocating output connected to the proximal end of the saw blade, a battery mounted to the main frame and electrically connected to the motor, and, a support mounted to the main frame and extending outward therefrom being attached to and supporting the distal end of the saw blade.

Another embodiment of the present invention is a battery operated, hand-held tool with multiple removable saw blades comprising a main frame, a coping saw blade removably and reciprocably mounted to the main frame and including a proximal end and a distal end, the coping saw blade including a thin main body incapable of supporting itself during sawing without the distal end supported, a motor mounted to the main frame and having a reciprocating output connected to the proximal end of the saw blade, a battery mounted to the main frame and electrically connected to the motor, a support mounted to the main frame and extending outward therefrom being attached to and supporting the distal end of the saw blade, and, a keyhole saw mountable to the main frame when the support and the coping saw blade are removed.

It is an object of the present invention to provide a hand-held battery operated coping saw.

A further object of the present invention is to provide a hand-held battery operated keyhole saw.

A further object of the present invention is to provide an electrically driven saw for use in coping saw and keyhole saw blade applications.

Further objects and advantages of the present invention will be apparent from the following description.

BRIEF DESCRIPTION OF THE DRAWINGS

FIG. 3 is a fragmentary side view of the driving and supporting mechanism associated with the coping saw blade.

FIG. 4 is a fragmentary top view of the holding mechanism associated with the proximal end of the coping saw blade of FIG. 3.

DESCRIPTION OF THE PREFERRED EMBODIMENT

Figure 1:
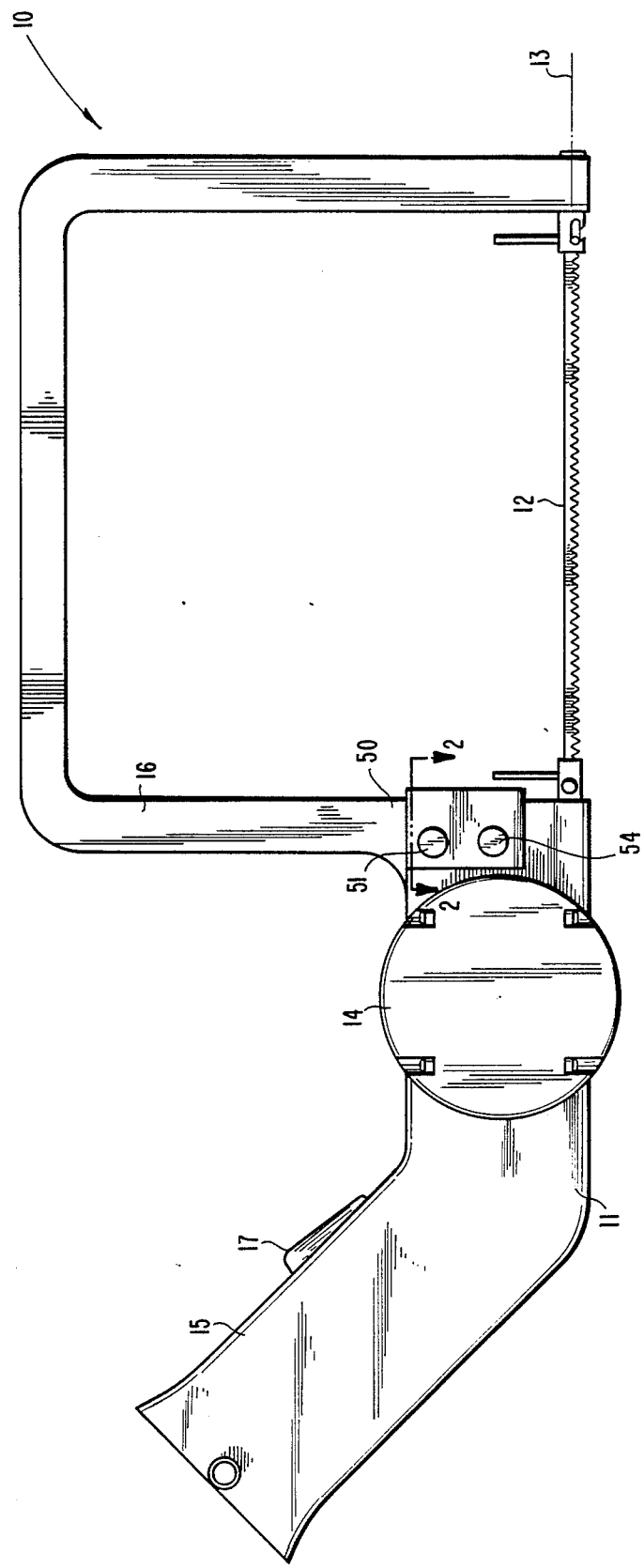
FIG. 1 is a side view of a coping saw incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a battery operated coping saw 10 having a main frame 11 for driving in reciprocating fashion a conventional coping saw blade 12. Blade 12 is removably mounted to main frame 11 and is reciprocably driven along longitudinal axis 13 by a battery operated motor 14 mounted to the handle 15 of main frame 11. A U-shaped frame 16 is removably mounted to main frame 11 and is operable to hold the outer end of saw blade 12.

Motor 14 (FIG. 3) is connected via a conventional thumb switch 17 to a plurality of batteries 18 removably mounted within the hollow handle 15 of the main frame. Likewise, thumb operated switch 17 is mounted to the handle and is operable to connect the batteries to the electric motor resulting in rotation of the electric motor output shaft 19. Disk 20 is fixedly mounted to output shaft 19 and is eccentrically connected to linkage 21 by means of pin 22 fixed to disk 20 and slidable within slot 23 of linkage 21. The outer end 24 of linkage 21 is threadedly received by mounting cylinder 25 in turn removably connected to the proximal end 26 of blade 12. The distal end 27 of blade 12 is removably mounted to cylinder 28 which is slidably received by end 29 of U-shaped frame 16. Cylinder 28 extends through aperture 30 and has an enlarged outer end 31 trapping a conventional helical spring 32 against the inner wall 33 of cavity 34 closed by cap screw 35. By closing switch 17, output shaft 19 and disk 20 are caused to rotate in the direction of arrow 36 pulling the saw blade to the left and compressing spring 32. Once the saw blade has reached its extreme left position, further rotation of the motor output shaft will allow helical spring 32 to force the blade in the direction of arrow 37 thereby completing the cycle.

The mutually facing ends of cylinders 25 and 28 are slotted to receive the saw blade which is secured thereto. For example, cylinder 25 includes slot 38 into which end 26 of blade 12 projects with a conventional fastening device such as a screw 39 securing the saw blade to the cylinder. Cylinder 28 likewise is slotted to receive the opposite end of blade 12 and has a pin 40 projecting into a downwardly opening slot 41 formed in the cylinder. In order to force pin 40 to the extreme left position of slot 41, fastener 39 may be loosened and blade 12 moved into cylinder 25 with fastener 39 then being tightened into the appropriate aperture provided on blade 12. Alternatively, fastening device 39 may be provided with a inner end abutting against the saw blade preventing relative motion therebetween. Cylinders 25 and 28 may be rotated with blade 12 around axis 13 to position the angle of cut relative to a plane containing axis 13 and frame 16 simply by rotating the cylinders on the external threads provided on the outer distal end 24 of linkage 21. A pair of upwardly extending rods 37 and 43 are provided, respectively, on cylinders 25 and 28 to allow the user to grasp and rotate the cylinders in unison about axis 13.

Figure 2:
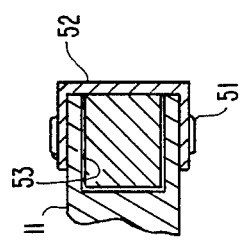
FIG. 2 is a fragmentary cross-sectional view taken along line 2—2 of FIG. 1 and viewed in the direction of the arrows.

U-shaped frame 16 is removably mounted to handle 15 by means of a pair of screws or release pins 51, 54 and bracket 52. Frame 11 includes an upwardly opening slot 53 into which bottom end 50 of frame 16 projects with fastener 51 (FIG. 2) extending through frame 16 and slot 53. The reverse C-shaped bracket 52 extends on the opposite sides of frame 11 and across slot 53 limiting relative motion between frames 11 and 16. A second release pin 54 may be provided immediately beneath pin 51 to increase the stability of frame 16 relative to frame 11.

Figure 5:
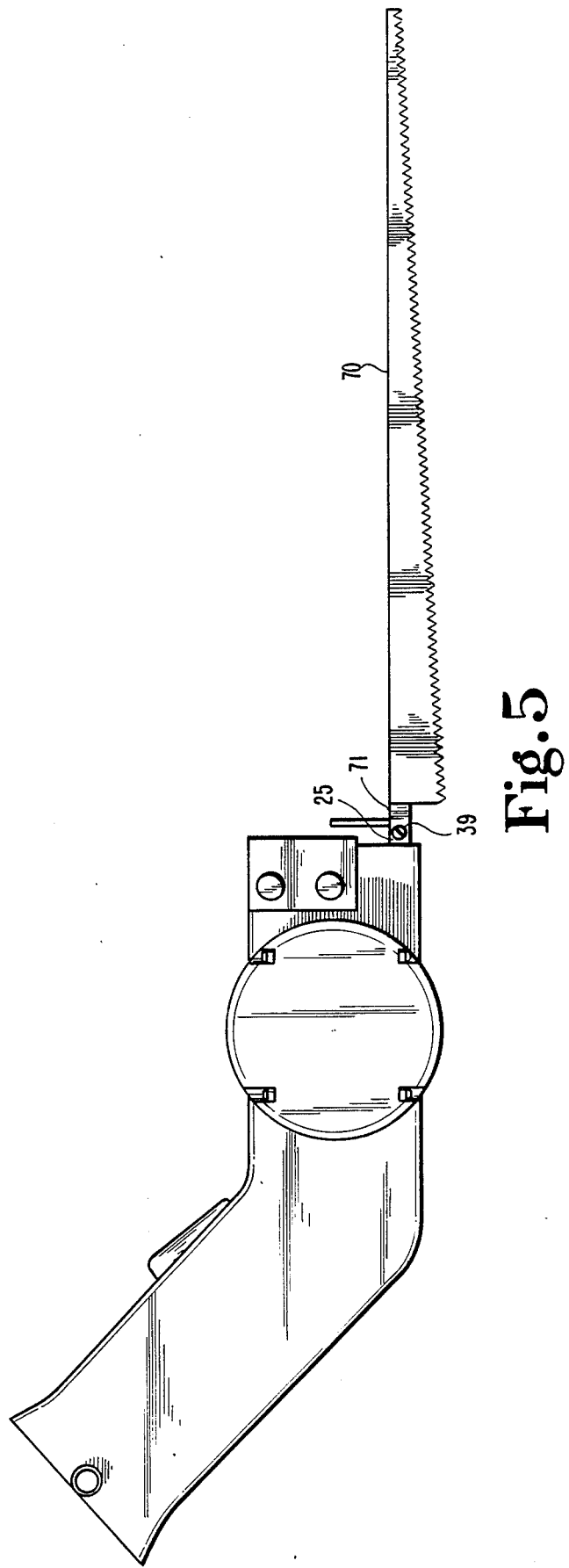
FIG. 5 is a side view of a hand held, battery operated keyhole saw.

Coping saw blade 12 must be sufficiently thin and small in height to enable the saw to be maneuvered easily when sculpturing the wood. Thus, the blade is incapable of supporting itself during sawing without the distal end 27 being supported by U-shaped frame 16. In order to increase the versatility of saw 10, the U-shaped frame 16 is removable along with coping saw blade 12 and a relatively sturdy keyhole saw 70 (FIG. 5) is removably mounted to cylinder 25. The proximal end 71 of blade 70 includes an aperture through which a conventional screw 39 is extended thereby mounting the saw to cylinder 25. The remaining portion of the saw main body 11 along with the battery operated motor is constructed as previously described for the embodiment shown in FIG. 1.

In one embodiment, coping saw 10 had an approximate length of 10 inches along axis 13, a height of 6 inches in a direction from saw blade 12 toward U-shaped frame 16 and a thickness of approximately 1 to 2 inches. The coping saw is able to cut pieces of wood at 45° angles to create a coped effect. Due to the shape and weight, the coping saw may be easily maneuvered at many angles and is able to cut different types of wood with the same speed and accuracy unlike the hand coping saw.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A battery operated coping saw comprising:

a main frame;

a coping saw blade removably and reciprocably mounted to said main frame and including a proximal end and a distal end, said coping saw blade including a thin main body incapable of supporting itself during sawing without said distal end supported;

battery powered motor means mounted to said main frame and having a reciprocating output connected to said proximal end of said saw blade;

support means mounted to said main frame and extending outward therefrom being attached to and supporting said distal end of said saw blade; and wherein, said support means includes a generally U-shaped frame with a first leg with a first end thereon and a second leg with a second end thereon, said U-shaped frame further includes a lateral portion extending between said first leg and said second leg with said lateral portion spaced apart from said coping saw blade and said second end attached to and supporting said distal end of said saw blade; and further comprising, spring means mounted to said second end of said second leg and receiving said distal end of said saw blade being operable to move said saw blade in a direction opposite to forced movement of said saw blade by said motor means; and wherein, said spring means includes a first mount reciprocably mounted to said second end of said second leg with said distal end of said saw blade removably connected to said first mount, said spring means further includes a spring connected between said first mount and said second end and operable to pull said saw blade in a direction away from said motor means but yieldable to allow said motor means to pull said first mount and said saw blade toward said motor means.

2. The coping saw of claim 1 wherein:

said saw blade includes a longitudinal axis of movement with said lateral portion of said support means contained within a plane containing said axis, said first mount mounted rotatable about said axis to allow said saw blade to be positioned at set cutting angles relative to said plane.

3. The coping saw of claim 2 wherein:

said main frame includes a griping handle extending away from said saw blade in a direction parallel to said plane.

4. The coping saw of claim 2 and further comprising:

release means including a release pin removable extending through said main frame and said first end of said first leg operable to limit relative motion between said main frame and said support means during sawing and further operable to allow removal of said support means from said main frame.

5. A battery operated, hand-held tool with multiple removable saw blades comprising:
a main frame;
a coping saw blade removably and reciprocably mounted to said main frame and including a proximal end and a distal end, said coping saw blade including a thin main body incapable of supporting itself during sawing without said distal end supported;
a keyhole saw removably and reciprocably mountable to said main frame when said coping saw blade is removed therefrom, said keyhole saw has an inner end to cantileveredly mount said keyhole saw to said main frame;
battery powered motor means mounted to said main frame and having a reciprocating output connected to said proximal end of said saw blade and connectable to said inner end of said keyhole saw when said coping saw blade is removed therefrom;
support means removably mounted to said main frame and extending outward therefrom being removably attached to support said distal end of said coping saw blade when said proximal end of said coping saw blade is mounted to said main frame; and wherein,
said support means includes a generally U-shaped frame with a first leg with a first end thereon and a second leg with a second end thereon, said U-shaped frame further includes a lateral portion extending between said first leg and said second leg with said lateral portion spaced apart from said coping saw blade and said second end attached to and supporting said distal end of said coping saw blade; and further comprising,
spring means mounted to said second end of said second leg and receiving said distal end of said saw blade being operable to move said saw blade in a direction opposite to forced movement of said saw blade by said motor means, said spring means including a first mount reciprocably mounted to said second end of said second leg with said distal end of said saw blade removably connected to said first mount, said spring means further including a spring connected between said first mount and said second end and operable to pull said saw blade in a direction away from said motor means but yieldable to allow said motor means to pull said first mount and said saw blade toward said motor means.

6. The coping saw of claim 5 wherein:
said saw blade includes a longitudinal axis of movement with said lateral portion of said support means contained within a plane containing said axis, said first mount mounted rotatable about said axis to allow said saw blade to be positioned at set cutting angles relative to said plane.

7. The coping saw of claim 6 and further comprising:
release means including a release pin removable extending through said main frame and said first end of said first leg operable to limit relative motion between said main frame and said support means during sawing and further operable to allow removal of said support means from said main frame.

8. A saw tool comprising:
a main frame with a handle, a battery compartment, and a main frame cavity;
an electric motor mounted to said main frame and electrically connected to said battery compartment, said motor including a reciprocable output;
a saw blade support frame having a proximal end connected to said main frame, a distal end with a support frame cavity spaced outwardly from said main frame and a connecting portion extending between and connected to said proximal end and said distal end;
a coping saw blade with an inner end connected to said output, an outer end connected and supported by said distal end of said support frame, and an intermediate saw blade portion extending between said outer end and said inner end and spaced apart from said connecting portion being sufficiently flexible to limit coping sawing action unless supported by said distal end of said support frame, said saw blade including a longitudinal axis extending between said inner end and said outer end;
a first mounting cylinder slidably and rotatably mounted in said support frame cavity and removably connected to said outer end of said coping saw blade, said cylinder being rotatable about said axis to allow said saw blade to be preset at an angle relative to said main frame; and,
a spring mounted in said support frame cavity and associated with said cylinder to pull said saw blade toward said support frame cavity.

9. The saw tool of claim 8 and further comprising:
a second mounting cylinder slidably and rotatably mounted in said main frame cavity which opens facing said support frame cavity, said second mounting cylinder being connected to said output and said inner end of said saw blade and being rotatable about said axis to allow said saw blade to be preset at an angle relative to said main frame.

10. A saw tool comprising:
a main frame with a handle, a battery compartment, and a main frame cavity;
an electric motor mounted to said main frame and electrically connected to said battery compartment, said motor including a reciprocable output;
a saw blade support frame having a proximal end removably connected to said main frame, a distal end with a support frame cavity spaced outwardly from said main frame and a connecting portion extending between and connected to said proximal end and said distal end;
a coping saw blade removably mounted to said main frame and said support frame and having an inner end removably connected to said output, an outer end connected and supported by said distal end of said support frame, and an intermediate saw blade portion extending between said outer end and said inner end and spaced apart from said connecting portion being sufficiently flexible to limit coping sawing action unless supported by said distal end of said support frame, said saw blade including a longitudinal axis extending between said inner end and said outer end;
first mounting means at said distal end of said support frame being removably connected to said outer end of said coping saw blade; and,
spring means mounted in said support frame cravity and being associated with said first mounting means to pull said saw blade toward said support frame cravity.

11. The saw tool of claim 10 and further comprising:
a key hole saw removably and reciprocably mounted to said main frame when said coping saw blade and said support frame is removed therefrom, said key hole saw has a first end to cantiliveredly mount said key hole saw to said main frame, said output connectable to said first end of said key hole saw when said coping saw blade is removed therefrom.

* * * * *